June 4, 1957     V. KOSA     2,794,368
FLUID CONDENSING LENS FOR PICTURE WINDOWS
Filed Aug. 9, 1955     2 Sheets—Sheet 1
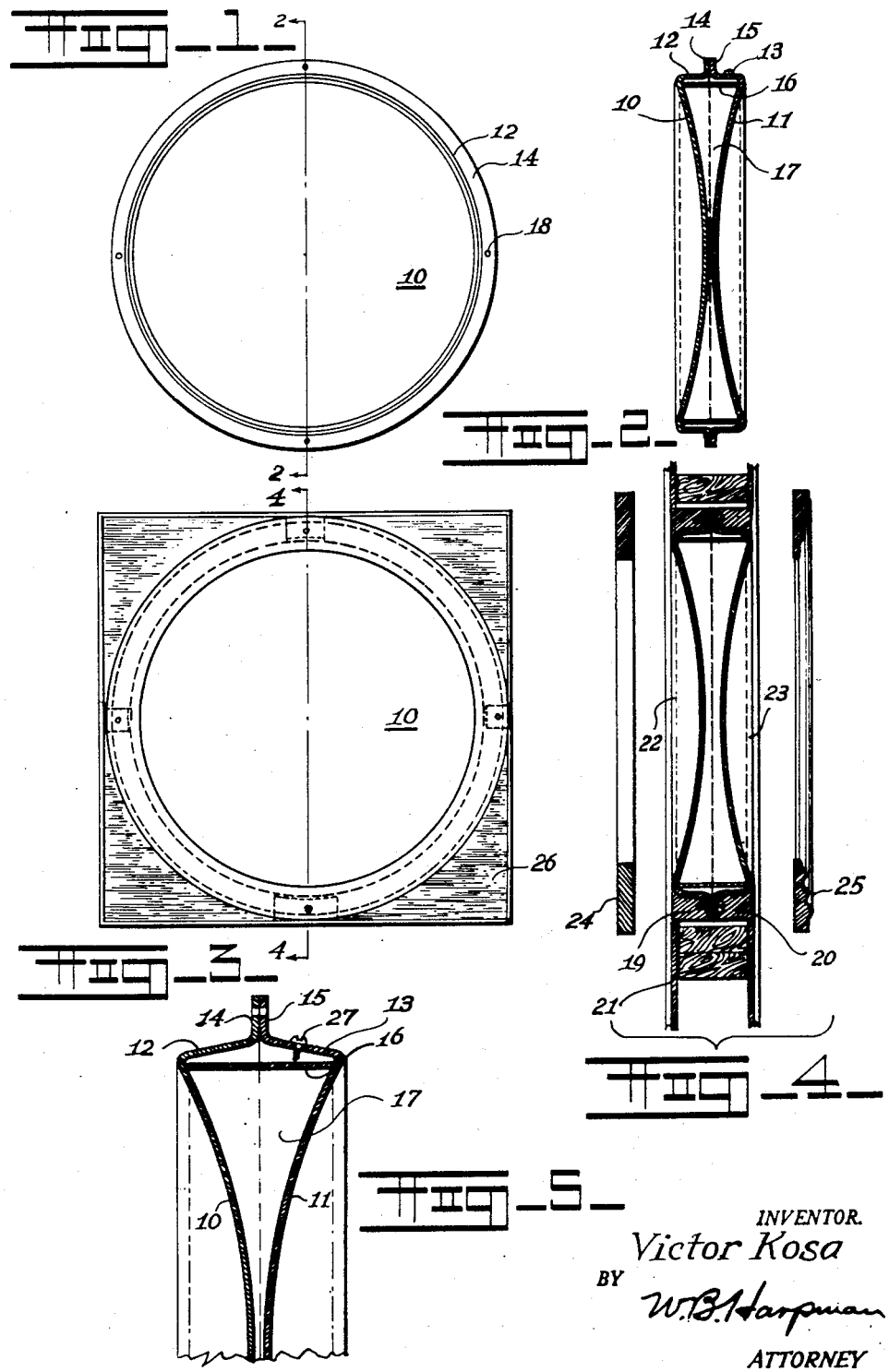
INVENTOR.
Victor Kosa
BY W. B. Harpman
ATTORNEY

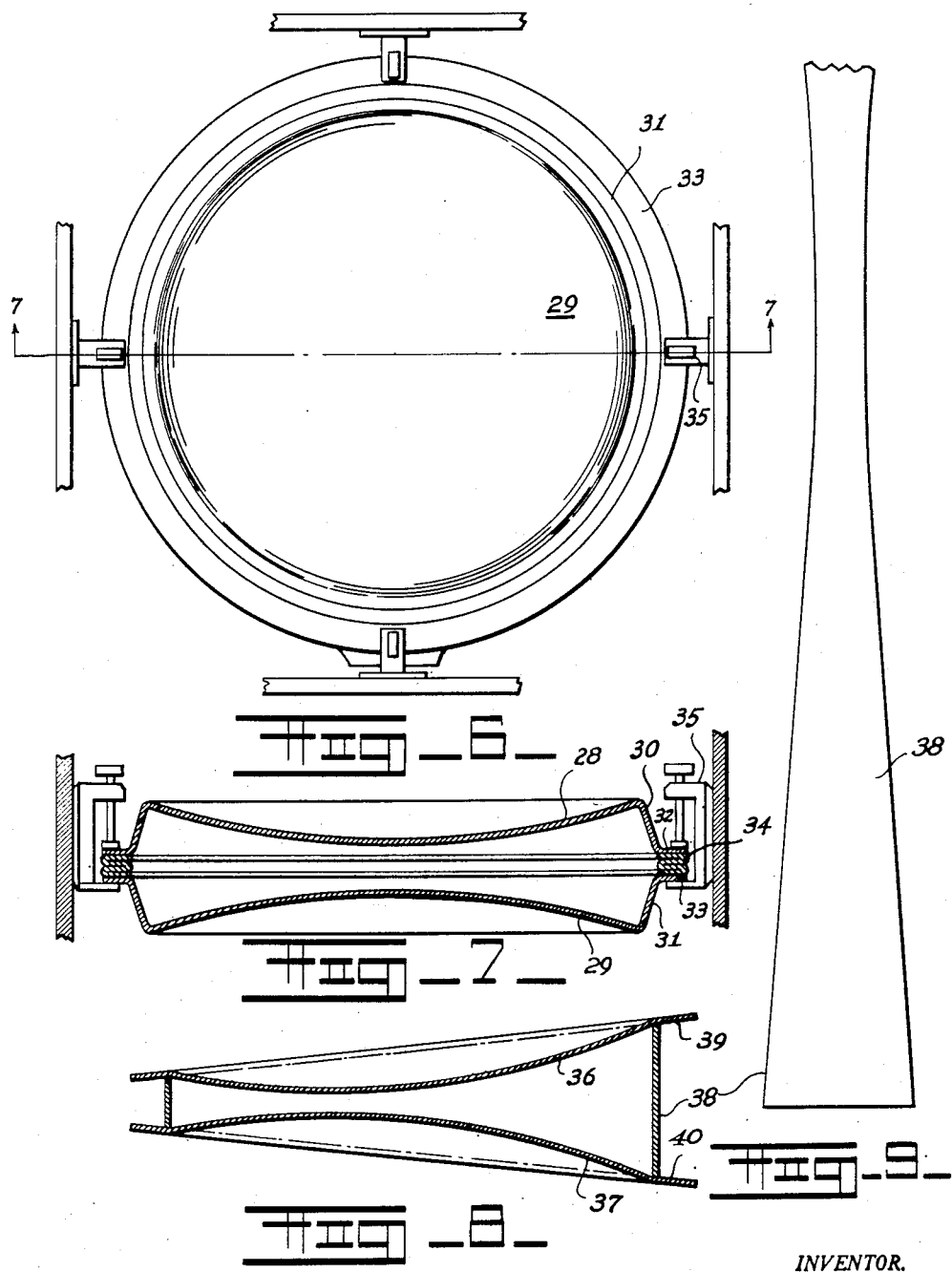

United States Patent Office 2,794,368
Patented June 4, 1957

2,794,368

FLUID CONDENSING LENS FOR PICTURE WINDOWS

Victor Kosa, Lowellville, Ohio

Application August 9, 1955, Serial No. 527,299

3 Claims. (Cl. 88—57)

This invention relates to a condensing lens of a size enabling it to be used as a picture window.

The principal object of the invention is the provision of a condensing lens formed of appropriately shaped sections of transparent material and filled with optical grade mineral oil or the like.

A further object of the invention is the provision of a condensing lens arranged so that one face thereof may be moved with respect to the other to impart directional characteristics to the lens.

A still further object of the invention is the provision of a condensing lens which is formed to include an opaque member about the periphery thereof limiting the field of view through the lens to the desired areas thereof.

A still further object of the invention is the provision of a condensing lens and means adjustably mounting the same.

The condensing lens disclosed herein is particularly adapted for use as a picture window in a dwelling house or the like and wherein a preferred view may be selected by adjustment of the lens in that direction.

Additionally, the lens may be used in commercial applications, for example, a drive-in theater modified to include seating arrangements immediately in front of the screen with one or more of the condensing lenses of this disclosure positioned between the seating arrangement and the screen.

The lens disclosed herein is formed of two oppositely disposed similarly formed lenses joined at their peripheral edges either in fixed or movable relation with respect to one another and a cavity between the transparent members filled with a light transmitting fluid.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein:

Figure 1 is a plan view of a condensing lens.

Figure 2 is a vertical section taken on line 2—2 of Figure 1.

Figure 3 is an elevation of the condensing lens installed in a window frame.

Figure 4 is an exploded vertical section taken on line 4—4 of Figure 3.

Figure 5 is an enlarged detail of the lens shown in Figures 1 and 3 of the drawings with parts broken away.

Figure 6 is a plan view of a modified form of lens incorporating an adjustable feature.

Figure 7 is a horizontal section taken on line 7—7 of Figure 6.

Figure 8 is a horizontal section through a further modification of the lens.

Figure 9 is a detail with parts broken away of a member incorporated in the modified lens of Figure 8.

By referring to the drawings and Figures 1 through 5 in particular it will be seen that the condensing lens in its simplest form comprises a pair of generally concave body members 10 and 11 formed of transparent synthetic resin such as Plexiglas and arranged in oppositely disposed relation.

The peripheral edge of the transparent body members 10 and 11 are inturned toward one another as at 12 and 13 and the ends thereof are outturned as at 14 and 15. The ends 14 and 15 abut one another and are secured to each other in a liquid-tight manner. An annular band 16 of translucent or opaque material is positioned within the cavity defined by the transparent body members 10 and 11 and adjacent the inturned end sections 12 and 13 thereof and forms a supporting structure with respect to uniform positioning of the transparent body members 10 and 11 and particularly with respect to their uniform spacing.

The cavity between the transparent body members 10 and 11 is indicated by the numeral 17 and is filled with a clear, light transmitting fluid such as optical grade mineral oil. The outturned edges 14 and 15 are apertured as at 18 at circumferentially spaced locations thereabout and the apertures used for mounting the condensing lens as disclosed in Figures 3 and 4 of the drawings.

In Figures 3 and 4 of the drawings the lens is shown positioned in mounting blocks 19 by means of fasteners 20 positioned through the apertures 18, the mounting blocks 19 being carried in a frame 21 which also carries transparent panels 22 and 23 on either side of the lens. The panels 22 and 23 are preferably formed of plate glass.

Interior and exterior trim 24 and 25 is positioned around the opening defined by the frame 21 and the corners are filled with lath 26 so that the wall area may be finished on the interior and exterior sides of the structure in which the condensing lens is positioned in the manner of a picture window.

In Figure 5 of the drawings a plug 27 is illustrated in an aperture in one of the ends 12 and 13, the aperture being used for filling the cavity 17 with the light transmitting fluid, as aforesaid.

It will thus be observed that a condensing lens has been disclosed which may be formed in a size enabling it to be used as a picture window in a dwelling house.

By referring now to Figures 6 through 9 of the drawings modifications of the lens hereinbefore described may be seen to comprise lenses which may be altered so that the view transmitted by the lens comes from a preferred direction rather than axially through the lens as in the case of the lens hereinbefore described. For example, in a picture window installation it may be desirable to aim the lens so that the view seen therethrough is to one side of the axial direction of the lens or above or below the central axial direction of the lens and the modifications of Figures 6 through 8 of the drawings illustrate two ways of altering the lens for this purpose.

In Figures 6 and 7 of the drawings a lens comprising transparent concave bodies 28 and 29 arranged in oppositely disposed relation is illustrated, the ends of the transparent bodies 28 and 29 being indicated by the numerals 30 and 31 and the ends 30 and 31 lying at substantially right angles to the arcuate plane of the major surface of each of the transparent bodies 28 and 29 with their ends being outturned as at 32 and 33. The outturned ends are not directly secured to one another as in the case of the lens hereinbefore described, but are secured to spaced portions of a flexible sealing member 34 which, as illustrated in cross section in Figure 7 of the drawings, comprises a section of flexible material bent backwardly upon itself in two complete folds.

The sealing member 34 is annular and has the tendency to move to a normal expanded relation whether or not both of the transparent bodies 28 and 29 are in maximum spaced relation. By positioning the lens, and the edges thereof in particular, in clamps 35—35 which are adjustable, distance between the edges of the lens may be controlled and adjusted to focus the lens and aim it in a direction other than its normal axial direction. For example, by loosening the clamp on the right hand side of the illustration of Figure 7 of the drawings, the edges of the transparent bodies 28 and 29 engaged by the clamp 35 will move apart. By providing a plurality of the clamps 35 about the peripheral edges of the lens it will occur to those skilled in the art that the focusing and directional aiming of the lens may be readily and easily achieved.

It will also occur to those skilled in the art that the volume of light transmitting fluid in the cavity formed by the transparent bodies 28 and 29 will vary depending upon the adjusted position of the bodies.

In Figure 8 of the drawings a further modification of the condensing lens is disclosed, the same being fixed in aimed direction with respect to the normal axial direction of a conventional lens.

The lens comprises oppositely disposed transparent bodies 36 and 37 which are concave and positioned in back-to-back relation and spaced by an annular band 38 of varying width. Peripheral edges 39 and 40 of the transparent bodies 36 and 37 are secured in liquid-tight relation to the annular edges of the band 38.

It will be observed by referring to the detail of Figure 9 of the drawings that the band 38 is formed of a strip of suitable material relatively wide at its ends and relatively narrow intermediate the ends. The ends are secured to one another to form the band 38 in the finished lens as disclosed in Figure 8 of the drawings.

It will occur to those skilled in the art that by varying the shape of the longitudinal edges of the strip from which the band 38 is formed, the spacing of the transparent bodies 36 and 37 may be arranged as desired.

It will further occur to those skilled in the art that by shaping the strip from which the band 38 is formed to present a plurality of flattened scallops along the longitudinal edges thereof, the resulting band will form a square or rectangular opening between the transparent bodies 36 and 37 rather than annular as in the preferred form of the invention.

It will thus be seen that the condensing lens disclosed herein may be used in fixed light transmitting form or alternately arranged for adjustable light transmitting directional shape or formed for selective directional light transmission.

It will thus be seen that the several objects of the invention have been met by the condensing lens for picture windows disclosed herein.

Having thus described my invention, what I claim is:

1. A condensing lens comprising a pair of concave transparent bodies, the edges of which are inturned and flanged and positioned adjacent to one another in back-to-back relation in the area of said edges, a flexible member joining said edges to one another and means for holding said transparent bodies in adjustable relation to one another, said means comprising movable members engaging said edges adjacent said flexible member therebetween and the area between said transparent bodies filled with a clear light transmitting fluid.

2. The condensing lens set forth in claim 1 and wherein the transparent bodies are rigid.

3. The condensing lens set forth in claim 1 and wherein the flexible member is folded annularly upon itself.

References Cited in the file of this patent

UNITED STATES PATENTS

| | | |
|---|---|---|
| 60,109 | Woodward | Nov. 27, 1866 |
| 509,379 | Ingram | Nov. 28, 1893 |
| 1,028,224 | Kohler | June 4, 1912 |
| 1,515,389 | Hopkins | Nov. 11, 1924 |
| 2,165,078 | Toulon | July 4, 1939 |
| 2,300,251 | Flint | Oct. 27, 1942 |
| 2,449,886 | Dougherty | Sept. 21, 1948 |
| 2,484,675 | Biderman | Oct. 11, 1949 |

FOREIGN PATENTS

| | | |
|---|---|---|
| 515,964 | France | Dec. 1, 1920 |